Nov. 19, 1935. M. F. PASCO 2,021,569
ENGINE TEMPERATURE CONTROL APPARATUS
Filed Dec. 1, 1933 2 Sheets-Sheet 1
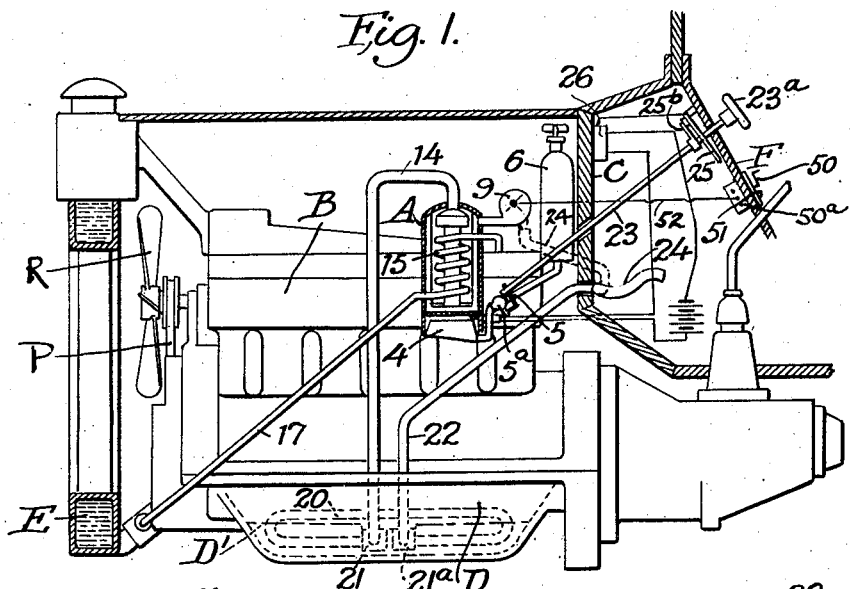
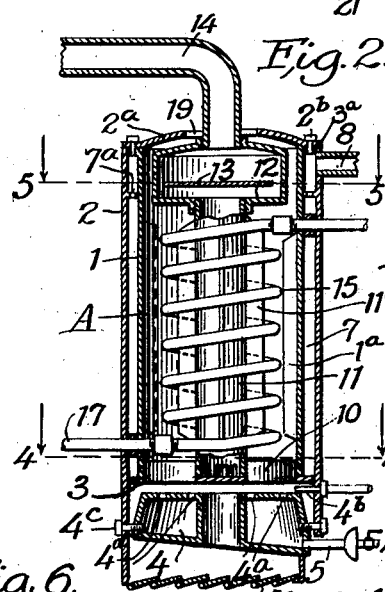
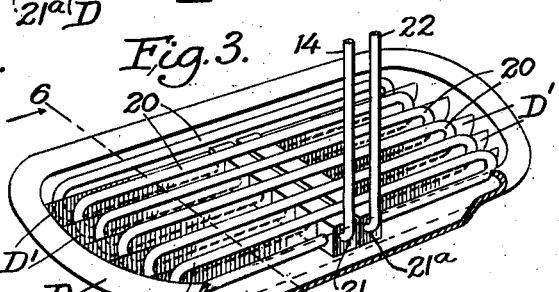
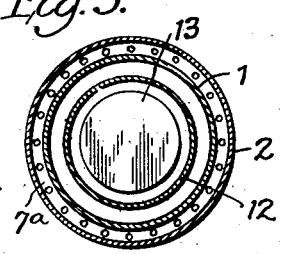
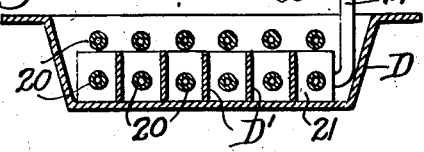

Nov. 19, 1935.    M. F. PASCO    2,021,569
ENGINE TEMPERATURE CONTROL APPARATUS
Filed Dec. 1, 1933    2 Sheets-Sheet 2
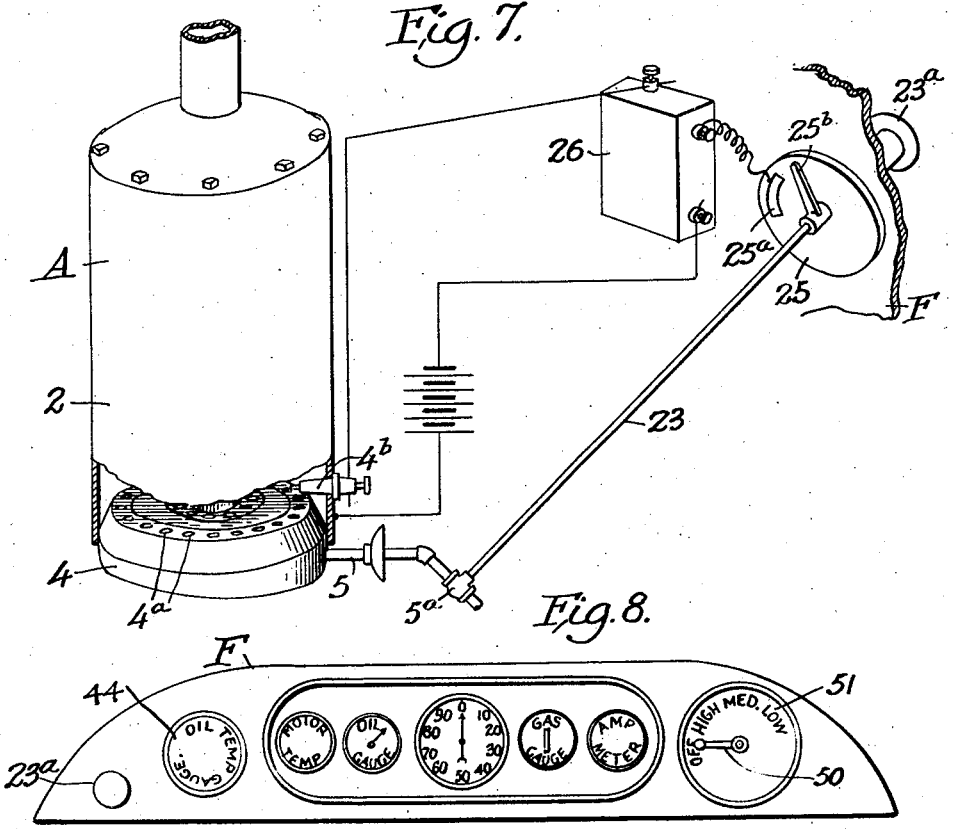
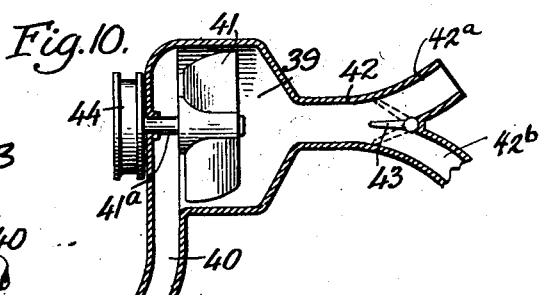
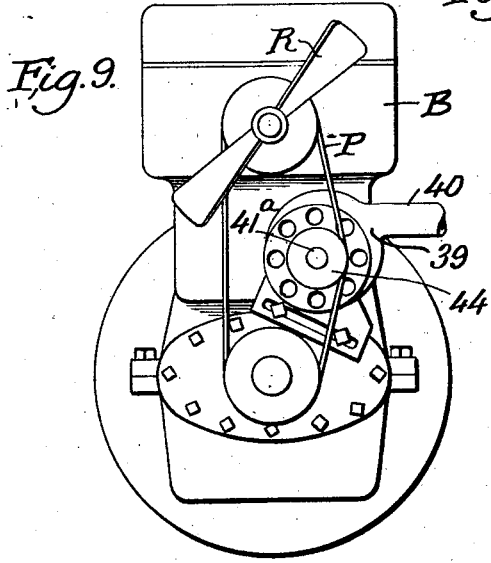

Patented Nov. 19, 1935

2,021,569

UNITED STATES PATENT OFFICE 2,021,569

ENGINE TEMPERATURE CONTROL APPARATUS

Merl F. Pasco, Sioux Falls, S. Dak.

Application December 1, 1933, Serial No. 700,553

15 Claims. (Cl. 123—174)

This invention is a novel heating or cooling apparatus particularly adapted for either heating or cooling the radiator fluid simultaneously with the heating or cooling of crank case lubricating oil of internal combustion engines and the like, means being provided for maintaining the temperature of the radiator fluid and crank case oil at a substantially constant temperature.

The principal object of the invention is to provide a novel air heater casing mounted on an automobile engine, and provided with a gas burner, from which casing heated air is forced through a novel arrangement of air coils disposed in the engine crank case and from thence through a flexible pipe to suitable heat receiving apparatus in the interior of the automobile body, said heater casing being also provided with water coils connected by piping with the bottom of the radiator of the cooling system of the engine and with the top of the engine block, whereby when the gas burner is lighted heated air in the chamber will heat the water in the coils and circulate same through the radiator and engine block simultaneously as the oil in the crank case is heated to insure easy starting of the engine during the winter weather when a car has been parked out of doors, thereby providing a practical preheating apparatus for automobile engines and the like which have been parked out of doors during cold weather and in localities where no extraneous electrical facilities are available, my heating apparatus utilizing no electrical facilities other than those which are part of the automobile or engine itself.

The application of heat in the heater casing serves the double purpose of heating the radiator solution of the cooling system and at the same time directing circulation of warm air into the coils in the crank case providing direct warming facilities for the oil therein, the warming of the cool motor and mechanism through the medium of the heating of the radiator solution also warming the crank case by diffusion of the heat through the metal of the engine block.

A further object is to provide an apparatus as above described which, if the burner is not lighted, may be used in hot weather to force atmospheric air under pressure from the said heater casing through the air coils in the crank case, and to cool the water coils in the said heater chamber, thereby simultaneously cooling the water in the radiator and the oil in the crank case when the engine is operating during hot weather.

Still further objects of the invention are to provide a novel heating casing with a blower for forcing air thereinto operated by a separate prime mover or by the usual fan belt carried by the motors; also to provide a gas burner in the casing, and means operable from the instrument panel of the machine for igniting and regulating the gas supply, whereby through control of the heat from the burner, or through control of the intake of air through the heater casing by control of the blower, an even temperature may be maintained in the engine crank case.

Other minor objects of the invention will be hereinafter set forth.

I will explain the invention with reference to the accompanying drawings which illustrate several practical embodiments thereof to enable others familiar with the art to adopt and use the same; and will summarize in the claims the novel features of construction, and novel combinations of parts, for which protection is desired.

In said drawings:—

Fig. 1 is a side elevation of an automobile engine and adjacent body parts, showing the application of my novel heating and cooling apparatus thereto.

Fig. 2 is an enlarged vertical section through the heater casing detached.

Fig. 3 is a perspective view of the lower portion of the crank-case housing removed, showing the arrangement of air coils therein.

Fig. 4 is a section on the line 4—4, Fig. 2.

Fig. 5 is a section on the line 5—5, Fig. 2.

Fig. 6 is a section on the line 6—6, Fig. 3.

Fig. 7 is a perspective view of the means for igniting the gas burner and for regulating the flow of gas.

Fig. 8 is a plan view of the instrument panel of the automobile.

Fig. 9 is a front elevation of the engine showing the blower operated by the usual fan belt.

Fig. 10 is an enlarged section through the blower shown in Fig. 9.

My apparatus comprises a heater casing A adapted to be mounted on the side of the engine B, said casing having spaced inner and outer walls 1 and 2, the space between the walls being closed at the lower end of the casing by a ring 3.

A ring 3a closes the space between the inner and outer walls 1 and 2 at the top of the casing, and a cover plate 2a is bolted as at 2b to ring 3a so as to close the upper end of the casing. Plate 2a is provided with an axially disposed opening 19 forming a vent for the interior of the casing. The space 7 between the walls 1 and 2 provides an air passage for air propelled by a force-fan 9 through the casing inlet 8 at the upper end of the casing. Means are provided for distributing the air from inlet 8 around the annular air passage 7 formed by the inner and outer walls 1 and 2, said means comprising a perforated ring 7a (Fig. 2) through which the air is forced downwardly after entering the inlet 8.

The air forced through the annular chamber 7 by blower 9 passes downwardly to the bottom of chamber 7 and inwardly through a series of radially disposed ducts 10, connecting the bottom of chamber 7 with a central air chamber 11 disposed axially of the heater casing A, from whence the air rises upwardly to the top of the chamber 11 and is diffused by a baffle 13 in an enlarged head 12 of chamber 11, the air passing out through air pipe 14 to the air coils 20 in the crank case D of the automobile. Ducts 10 are radially disposed and are slightly arcuate in shape to permit ready expansion and contraction of the ducts as the latter are disposed immediately above the gas burner 4, the hot gases passing between the ducts 10 and upwardly through the casing A, exterior to chamber 11, around head 12, and out of the flue 19.

Around the air chamber 11 is a water coil 15 having its lower inlet end connected by pipe 17 with the base of the radiator E of the automobile, and having its upper outlet end delivering water into the cooling duct in the top of the engine block B, as indicated in Fig. 1. As the top plate 2a of the casing A is detachable, and as the coil 15 is connected by couplings to the pipes leading to the radiator and engine block, and as head 12 is threaded on pipe 14 and chamber 11, an easy method of removing and replacing the water-coil 15 is provided. Preferably the walls 1 and 11 of casing A are provided with radiating fins 1a and 11a respectively to present greater heat radiation, the coil 15 being disposed around the fins 11a as indicated in Fig. 2.

In the lower end of casing A below ring 3 is mounted a burner 4, preferably an approved gas burner suitable for burning "Skelly" or other tanked gas familiar to the commercial market, said gas being conducted to burner 4 by a pipe 5 leading from a pressure storage tank 6 (Fig. 1) mounted on dash board C of the automobile. Gas tank 6 is preferably installed so that it may be readily replaced by another when empty. Burner 4 preferably comprises an annular casting adapted to fit within the lower open end of casing A and is removably secured therein by tap bolts 4c (Fig. 2). Burner 4 has annular series of perforations 4a in its upper face through which the gas discharges, the gas being ignited by a spark plug 4b or other means entering the side of casing A adjacent the burner. Burner 4 is of such size with respect to casing A that the flame therefrom will uniformly heat all surfaces, and the open center of burner 4 permits sufficient influx of air to support combustion.

Extending through the instrument panel F of the automobile is a combined gas and spark control rod 23 for operating the gas valve 5a and plug 4b, whereby the burner may be manually controlled from the instrument board. Rod 23 is connected to the stem of gas valve 5a whereby rotation of the rod will open or close the valve. Rod 23 carries a knob 23a on its upper end by which the rod may be rotated. A fixed non-conducting disk 25 (Figs. 1 and 7) is mounted on the back of panel F and rod 23 passes through said disk, which carries a contact segment 25a adapted to be engaged with a wiper arm 25b on rod 23, the contact closing a circuit through a vibrating coil 26 to excite the sparking device 4b as long as the arm 25b is in contact with segment 25a. By the above construction, as rod 23 is rotated from "Off" position the gas valve 5a opens, and simultaneously arm 25b will engage contact segment 25a and produce a spark at the spark plug 4b. As the rod is further rotated the arm 25b will pass beyond the far end of segment 25a and the sparking circuit, after the burner is ignited, will be broken. The method of producing a spark with the vibrating coil is well known and needs no description herein, and suitable spring or other means may be provided for urging the arm 25b towards the contact 25a to insure a good contact.

The air coils 20 in the crank-case preferably comprise a series of parallel split loop units (Figs. 3 and 6), each individually connected at their ends to parallel and adjacent intake and exhaust headers 21, 21a in the bottom of the crank case arranged transversely of the series of coils. Hot air pipe 14 from casing A leads into the intake header 21, while exhaust header 21a is connected to a pipe 22 passing through dash C.

The heated air passing through the outlet pipe 22 from the crank-case coils 20 may be conveyed through flexible tubing 24, which may be made easily detachable at the dash C, and used for the purpose of conducting heat to parts of the interior of the automobile body when the device is used for the purpose of warming a cold motor in winter weather, or the heated air may be used as a hot blast torch for multiple purposes, particularly in thawing out a frozen carburetor, for drying out the wiring or ignition system in rainy weather, or for other purposes where a hot drying medium is required. The flexible tubing 24 can be of any length suitable for such purpose.

Preferably parallel webs D' are formed or disposed in the bottom of crank-case D to strengthen the coil structure and to permit more effective heat radiation.

Through the header arrangement free circulation of heated air is maintained in each of the parallel crank-case coils 20, providing small air resistance and avoiding the necessity of forcing the circulation of the hot air through a single long coil as would be the case if the coils 20 were arranged in series as one continuous unit. The number, size and length of coils 20 placed in a crank-case may be varied according to the size of the particular crank-case in which the coils are installed.

In Fig. 1 an electric motor (not shown) is used for operating the blower 9. The motor is under rheostat control so that the speed thereof can be regulated by a switch located on the instrument panel F of the car. As shown in Figs. 1 and 8 an arm 50 of a rheostat 50a cooperates with a dial 51 on panel F bearing the notation "Off", "High", "Medium" and "Low", whereby setting of the arm 50 will control the speed of the motor through the rheostat circuit 52 which operates the motor of blower 9. Variation of the speed of the motor of blower 9 will regulate the amount of air, either hot or cold, passing from the casing A through the coils 20 in the crank-case, thus providing a proper heating or cooling balance in all driving temperatures.

In Figs. 9 and 10 a modification is shown in which the blower 39 is driven by the fan belt of the engine. Blower 39 is mounted on the front end of the engine block B and has an air intake pipe 40 drawing in air preferably from the outside of the radiator hood (not shown), the air passing the impeller 41 and into a junction box 42, one branch 42b of which conducts air directly into the air inlet 8 of casing A. The other branch 42a discharges directly into the atmosphere. A flap valve 43 is arranged in junction box 42 and is manually controllable to direct more or less air into the branch 42b leading to inlet 8. Impeller shaft 41a extends out of the blower casing 39 and carries a pulley 44 over which runs the fan belt P of the motor fan R, whereby the impeller 41 is driven by and with the fan belt. While the speed of the impeller driven by the fan belt cannot be controlled, nevertheless the adjustment of the flap valve 43 permits regulation of the amount of air entering the inlet 8 of the casing A. Flap valve 43 may be controlled by any suitable linkage operated from the instrument panel F of the machine.

When the fan belt P of the motor is used to furnish motive power to drive the blower, use of a separate electric motor is eliminated and may be desirable when occasions are appropriate. The advantage of such connection would be that the faster the engine runs and the fan spins, the faster the blower will be driven propelling the air through the apparatus, and the supply of air through the apparatus would be regulated by the speed of the engine, whereby as speed develops with consequent development of heat, the circulation of the air through the apparatus will be increased. With proper adjustment between the fan belt and blower the cooling arrangement would be self-regulatory.

Use of the apparatus with reversed circulation of air through the chamber A will provide in hot weather an additional cooling unit for the radiator fluid. It is obvious that if during the cooling operation, air should be forced by blowers 9 or 39 into chamber A through the normal air intake used for heating purposes, such air would be considerably heated by the radiator fluid circulating in coil 15 of chamber A before the air passes into crank case coil 20. The radiator fluid in coil 15 would naturally be hot when driving in hot weather, and the air in chamber A passing around the coil 15 would thereby be considerably heated prior to passing to the radiator coil 20 in the crank case. To avoid this the circulation of the air is reversed, the air being forced down through the flexible pipe 24, through crank case coil 20, and upwardly through the pipe 14 into chamber A and out through the vent which is normally used as an air intake when the apparatus is used for heating purposes. As previously described, pipe 24 is flexible, and the end thereof during the cooling operation is connected with the outlet of blowers 9 or 39, as shown in dotted lines in Fig. 1, after first detaching the blowers 9 or 39 from the normal air intake of chamber A, whereby the circulation of air through the crank case coil 20 is reversed.

Tests of the apparatus demonstrate that when the gas heater is ignited a still motor in frigid temperatures may be warmed in a very few minutes, overcoming the winter stiffness of the oil. Actual experiments have shown that through this device a cold motor can be heated and easily started in a very few minutes after lighting the burner 4 through the dash control rod 23; and that by means of the hot air pipe 22 and 24 the interior of the body of the automobile will also be considerably warmed by the time the operator is ready to start the engine. Once installed the apparatus has no particular wearing parts and should require no repairs during the life of the car. The combined action of the circulating water and the circulation of warm air through the crank-case provides an effective method of warming up an engine which cannot be accomplished with the ordinary electrical radiator heating devices by means of which the entire block must be warmed by the radiator fluid before the crank-case is heated. A particular benefit lies in the opportunity it affords of using oil of the same consistency in winter as that employed in summer driving. Ordinarily winter oil thinned down to an extent sufficient to permit the turn-over of a cold motor by operation of the starter motor, is not of proper consistency to effectively lubricate the engine. This is readily understood in cold temperatures where the crank-case oil appropriate for driving becomes so rigid in cold weather that it operates to practically seal and set the moving parts and prevent a turn-over of the motor.

The apparatus also serves as an effective cooling system in warm weather through the simple expedient of not using the burner 4, under which condition the direction of air circulation through the chamber A is reversed as above explained and cool outside air, forced directly into the crank case coils 20 by the blowers 9 or 39 hereinbefore described, the air passing upwardly through and out of the chamber A. Through control of the speed of his electric motor of the blower 9 or the flap valve 43, the oil in the crank-case may be maintained at a uniform relatively cool temperature, i. e., one which is best suited to the oil and its lubricating qualities. Lubricating oil thins and breaks down under excessive heat, and if the same is maintained at a proper temperature a supply will last for a considerably longer time and its lubricating properties will be maintained at the proper standard without damage to the wearing parts of the car. An oil temperature gauge 44 may be disposed on the instrument panel F so that the operator may more readily maintain a proper supply of air to casing A.

If desired an adjustable shutter 50 may be arranged beneath the gas burner 4 to prevent any direct or violent draft of air from extinguishing the flame, said shutter being shown as similar to the overlapping sections of an ordinary window shutter. Any other type of shutter however may be used.

I claim:

1. In combination with an engine having a crank-case, a coil in the crank-case, a heater having an air duct, means for supplying air to the duct, a connection between the outlet of said air duct and the inlet of the coil, means whereby the air may be heated in the heater, said heater comprising an annular chamber, a central chamber, ducts connecting the lower ends of the chambers, said chambers forming the air duct; said annular chamber having an air inlet at its upper end; a distributor within the annular chamber below the inlet, and a burner disposed below said chambers.

2. In combination with an engine having a crank-case, a coil in the crank-case, a heater having an air duct, means for supplying air to the duct, a connection between the outlet of said air duct and the inlet of the coil, means whereby the air may be heated in the heater, said engine having a fan actuated by a belt; and said air forcing means comprising a blower having an impeller actuated by the belt; a pipe connecting the blower with the air duct in the heater; a by-pass in said pipe and means for directing more or less air from the pipe into the by-pass.

3. In combination with an engine having a crank-case, a coil in the crank-case, a heater having an air duct, means for supplying air to the duct, a connection between the outlet of said air duct and the inlet of the coil, means whereby the air may be heated in the heater, a gas supply tank connected with the heater; a valve in said connection; an igniter in the heater; and means for simultaneously operating the valve and actuating the igniter.

4. In combination with a water jacketed engine having a crank-case, a heater having an internal water duct connected at its upper end with the upper part of the water jacket of the engine and at its lower end with the lower part of such water jacket, an air duct in the heater, a coil in the crank-case, a connection between the outlet of the heater air duct and the inlet of the coil, means for forcing air through said air duct, and means whereby the air and water may be heated in the heater.

5. In a combination as set forth in claim 4, said heater casing comprising an annular chamber, a central chamber, ducts connecting the lower end of the chambers, said chambers forming the air duct of the heater, a coil within the casing around the central chamber forming the water duct; said annular chamber having an air inlet at its upper end; and said central chamber having an outlet in its upper end.

6. In a combination as set forth in claim 4, said engine having a fan actuated by a belt; and said air forcing means comprising a blower having an impeller actuated by the belt; a pipe connecting the blower with the air duct of the heater; a by-pass in said pipe and means for directing more or less air in the pipe into the by-pass.

7. In combination with a water jacketed engine having a crank-case, a heater having an internal water duct connected at its upper end with the upper part of the water jacket of the engine and at its lower end with the lower part of such water jacket, an air duct in the heater, means for forcing air through the air duct; a coil in the crank-case, a connection between the outlet of the heater air duct and the inlet of the crank-case coil, the heater having a gas burner, means for supplying gas to the burner, and manually controlled means whereby the burner may be turned on and off at the will of the operator.

8. In a combination as set forth in claim 7, said heater comprising an annular chamber, a central chamber, expansible ducts connecting the lower ends of the chambers, said chambers forming the heater air duct; a coil around the central chamber forming the heater water duct; said annular chamber having an air inlet at its upper end; said central chamber having an enlarged head at its upper end below the outlet, and a baffle in said head.

9. In a combination as set forth in claim 7, said engine having a fan actuated by a belt; and said air forcing means comprising a blower mounted adjacent the fan, said blower having an impeller actuated by the fan belt; a pipe connecting the blower with the air duct of the heater; a by-pass in said pipe and means for directing more or less air in the pipe into the by-pass.

10. A heating and cooling apparatus for internal combustion engines having fluid cooled engine blocks and having crank-case lubrication, comprising a heater casing having an air duct; a coil in the crank-case; a pipe connecting the coil and air duct; a fluid duct in said heater casing having its ends connected with the bottom and top of the cooling duct in the engine block; means for normally forcing air through the air duct; said means permitting the circulation of air to be reversed; and a burner in said casing whereby when the burner is "on" and the circulation of air normal the cooling fluid and lubricating oil will be simultaneously heated, and whereby the lubricating oil will be cooled when the burner is "off" and the circulation of air reversed.

11. In apparatus as set forth in claim 10, said engine having a fan actuated by a belt; and said air forcing means comprising a blower mounted adjacent the fan and having an impeller actuated by the belt; a pipe connecting the blower with the air duct of the heater, a by-pass in said pipe; and means for directing more or less air in the pipe into the by-pass.

12. In combination with an engine having a crank-case; a radiator in the crank-case; a heater having an air duct and comprising an annular chamber having an inlet in its upper end, a central chamber having an outlet in its upper end; ducts connecting the lower ends of the chambers, said chambers forming the air duct; means for supplying air to the inlet, a connection between the outlet and the radiator; and means whereby the air may be heated in the heater.

13. In combination with an engine having a crank-case, a radiator in the crank-case; a heater having an air duct and comprising an annular chamber having an inlet in its upper end, a central chamber having an outlet in its upper end; ducts connecting the lower ends of the chamber, said chambers forming the air duct; means for supplying air to the inlet, a connection between the outlet and the radiator, and a burner disposed adjacent the chambers whereby the air may be heated in the heater.

14. In combination with an engine having a crank-case, and having a fan actuated by a belt; a radiator in the crank-case; a heater having an air duct, a blower having an impeller actuated by the belt for supplying air to the duct, means for diverting more or less air from the blower from entering the duct; a connection between the outlet of said duct and the radiator; and means whereby the air may be heated in the heater.

15. In combination with an engine having a crank-case, and having a fan actuated by a belt; a radiator in the crank-case; a heater having an air duct, a blower having an impeller actuated by the belt; a pipe connecting the blower with the air duct; means in advance of the duct for diverting more or less air from the pipe; a connection between the outlet of said duct and the radiator; and means whereby the air may be heated in the heater.

MERL F. PASCO.